(12) United States Patent
Kalokitis et al.

(10) Patent No.: US 7,486,081 B2
(45) Date of Patent: Feb. 3, 2009

(54) APPARATUS AND METHOD FOR MONITORING AND CONTROLLING DETECTION OF STRAY VOLTAGE ANOMALIES

(75) Inventors: David Kalokitis, Robbinsville, NJ (US); Leonard Joshua Schultz, Holland, PA (US); Christos A. Polyzois, Golden Valley, MN (US); Vincent Paragano, Yardley, PA (US)

(73) Assignee: Power Survey LLC, Kearny, NJ (US)

( * ) Notice: Subject to any disclaimer, the term of this patent is extended or adjusted under 35 U.S.C. 154(b) by 0 days.

(21) Appl. No.: 11/551,222

(22) Filed: Oct. 19, 2006

(65) Prior Publication Data

US 2007/0179737 A1 Aug. 2, 2007

Related U.S. Application Data

(63) Continuation-in-part of application No. 11/224,909, filed on Sep. 13, 2005, now Pat. No. 7,248,054.

(60) Provisional application No. 60/728,168, filed on Oct. 19, 2005.

(51) Int. Cl.
*G01R 31/08* (2006.01)
(52) U.S. Cl. .................. 324/522; 324/72; 324/133; 324/457; 340/562; 340/657; 340/660; 343/718
(58) Field of Classification Search .................. 324/522
See application file for complete search history.

(56) References Cited

U.S. PATENT DOCUMENTS

| | | | | |
|---|---|---|---|---|
| 4,716,371 A | * | 12/1987 | Blitshteyn et al. | 324/457 |
| 4,758,792 A | * | 7/1988 | Polonis et al. | 324/552 |
| 5,952,820 A | * | 9/1999 | Thrasher et al. | 324/119 |
| 6,154,178 A | * | 11/2000 | Aslan | 343/718 |
| 6,317,683 B1 | * | 11/2001 | Ciprian et al. | 701/118 |
| 6,329,924 B1 | * | 12/2001 | McNulty | 340/660 |
| 6,411,103 B1 | * | 6/2002 | Tobias et al. | 324/632 |
| 6,788,215 B1 | * | 9/2004 | White | 340/657 |
| 6,859,141 B1 | * | 2/2005 | Van Schyndel et al. | 340/562 |
| 2003/0071628 A1 | * | 4/2003 | Zank et al. | 324/457 |
| 2004/0103409 A1 | * | 5/2004 | Hayner et al. | 717/143 |
| 2006/0027404 A1 | * | 2/2006 | Foxlin | 178/18.06 |
| 2006/0139031 A1 | * | 6/2006 | Kalokitis et al. | 324/457 |
| 2006/0139032 A1 | | 6/2006 | Kalokitis et al. | |

OTHER PUBLICATIONS

International Search Report and Written Opinion, mailed Aug. 29, 2008 for PCT Application No. PCT/IB06/04314.

\* cited by examiner

*Primary Examiner*—Vincent Q. Nguyen
*Assistant Examiner*—Benjamin M Baldridge
(74) *Attorney, Agent, or Firm*—Moser IP Law Group

(57) ABSTRACT

A mobile apparatus for monitoring an electric field in a patrolled area, comprising at least one detection device for measuring electric field signals, at least one camera device for collecting video images of said patrolled area, a processor for correlating video image data collected from the camera device with electric field signal data measured by the detection device, and a video based graphical user interface for analyzing and capturing a monitored event depicting an anomaly in the measured electric field signals.

44 Claims, 14 Drawing Sheets

APPARATUS AND METHOD FOR MONITORING AND CONTROLLING DETECTION OF STRAY VOLTAGE ANOMALIES

CROSS-REFERENCE TO RELATED APPLICATIONS

This patent application claims the benefit of U.S. Provisional Patent Application No. 60/728,168, filed Oct. 19, 2005, which is hereby incorporated by reference in its entirety. This patent application is also a continuation-in-part of and claims priority to U.S. patent application Ser. No. 11/224,909, filed Sep. 13, 2005, now U.S. Pat. No. 7,248,054.

BACKGROUND OF THE INVENTION

1. Field of the Invention

The present invention relates to the detection of electric fields. More particularly, the present invention is directed to an apparatus and method employing a video graphical user interface configured to enhance mobile detection and monitoring of stray voltage anomalies.

2. Description of the Related Art

Large power distribution systems, especially those in large metropolitan areas, are subject to many stresses, which may occasionally result in the generation of undesirable or dangerous anomalies. Ah infrequent, but recurrent problem in power distribution infrastructures is the presence of "stray voltages" in the system. These stray voltages may present themselves when objects, such as manhole covers, gratings, street light poles, phone booths and the like become electrically energized (e.g., at 120V AC). An electrically conductive path may be established between underground secondary network cabling and these objects through physical damage to electrical insulation resulting in direct contact between electrically conductive elements or through the introduction of water acting as a conductor. These energized objects present obvious dangers to people and animals in the general public.

Detecting the existence of stray voltages by means of assessing electromagnetic radiation is not practical because the wavelength of a 60 Hz electromagnetic wave is approximately 5,000 kilometers (i.e., about 3,107 miles) in length. To effectively radiate electromagnetic waves, a radiating object (e.g., manhole cover or light pole) should represent at least ¼ wavelength (i.e., about 776.75 miles) and a receiving "antenna" should be 1½ to 2 wavelengths away from the emitting source (about 6,214 miles). Two wavelengths is the distance required for electric and magnetic fields to come into time phase and space quadrature where they behave as a plane wave. A detection system will typically be perhaps 10 ft. to 30 ft. away from the energized object, so that detection will take place in the extreme near field where electric and magnetic fields exist in a complex temporal and spatial pattern, not as a unified electromagnetic plane wave. Thus, electric and magnetic fields must be considered and measured separately.

Due to power distribution networks typically having many miles of buried cable carrying perhaps thousands of amperes of current, the magnetic field in any one location due to such normal load is likely to be very high. Detecting magnetic fields arising from a relatively weak stray voltage anomaly would be very difficult due to the interference from strong ambient magnetic fields arising from normal loads and, therefore, it has been determined that the best way to detect a stray voltage anomaly is to assess the electric field.

Techniques for the detection of stray voltages are typically carried out by manual inspection of surrounding electrical infrastructures for signs of leaking current. An inspection team equipped, for example, with hand held detection devices may be employed to make direct physical inspections of electrical infrastructures. However, inspectors using these detection devices are typically required to make contact with portions of electrical infrastructures, such as streetlamp bases or manhole covers, in order to obtain accurate measurements for determining the existence of potentially dangerous stray voltages. These manual inspections are undoubtedly time-consuming and give a false sense of security.

Accordingly, there exists a need to provide a more efficient means for detecting and identifying sources of stray voltage anomalies over vast geographic areas, particularly, populated urban, suburban and rural areas.

SUMMARY OF THE INVENTION

In view of the foregoing, it is an object of the present invention to provide a mobile stray voltage detection apparatus and method configured to sense potentially dangerous stray voltage anomalies from a moving vehicle.

It is another object of the present invention to provide a mobile stray voltage detection apparatus and method configured to provide real-time awareness of detected stray voltage anomalies, thereby enabling rapid and efficient inspection of surrounding patrolled areas.

It is yet another object of the present invention to provide a mobile stray voltage detection apparatus and method configured to provide accurate location and visual identification of potential hazards.

These and other objects of the present invention are accomplished in accordance with the principles of the present invention by providing a mobile stray voltage detection system integrated with a user-controllable monitoring interface, wherein the user interface is a video based graphical user interface configured to enhance the detection of stray voltage anomalies. Input to the mobile stray voltage detection system is provided by at least one vehicle mounted sensor probe, which is sensitive to the presence of an electric field in at least one axis. Such a vehicle mounted sensor probe system is described, for example, in commonly owned U.S. Pat. No. 7,248,054 issued Jul. 24, 2007 and U.S. Pat. No. 7,253,642 issued Aug. 7, 2007, which are hereby incorporated by reference. The vehicle is additionally mounted with at least one camera unit for recording a scene being patrolled for stray voltage anomalies using the vehicle mounted sensor probe. Intensity of electric field signals are communicated to an operator through means of an audio tone that is pitch proportional to strength of the field detected, as well as through a visual display, both user communication means being controllable through the user interface. Distance traveled by the vehicle, as well as GPS positions of the vehicle throughout various points of the vehicle's travel, are also provided as input to the mobile stray voltage detection system in order to tag the location of measured electric fields and further assist the operator in isolating an anomaly-emitting source.

In accordance with the present invention, the graphical user interface provides a video display for depicting a graphical representation of the electric field signal strength and corresponding video image of a patrolled scene. Vehicle mounted camera units present video images of the passing scene on the video display portion of the user interface. Signals measured by the sensor probe are analyzed by a processing unit to produce a "moving chart" graphical display of the electric field strength. The graphical display of the measured field strength are associated with and overlaid on the video images of the patrolled scene, thereby assisting a user to isolate and associate the source of the stray voltage anomaly to specific infrastructures depicted in the patrolled scene.

BRIEF DESCRIPTION OF THE DRAWINGS

The above and other objects and advantages of the present invention will become apparent upon consideration of the following detailed description, taken in conjunction with the accompanying drawings, in which like reference characters refer to like parts throughout, and in which.

It is to be understood that the above-identified drawing figures are for purposes of illustrating the concepts of the present invention and may not be to scale, and are not intended to be limiting in terms of the range of possible shapes and proportions of the present invention.

DETAILED DESCRIPTION OF THE PREFERRED EMBODIMENTS

The present invention is directed towards a mobile apparatus and method for monitoring and controlling the detection of stray voltage anomalies in a patrolled environment. For purposes of clarity, and not by way of limitation, illustrative depictions of the present invention are described with references made to the above-identified drawing figures. Various modifications obvious to one skilled in the art are deemed to be within the spirit and scope of the present invention.

Figure 1:
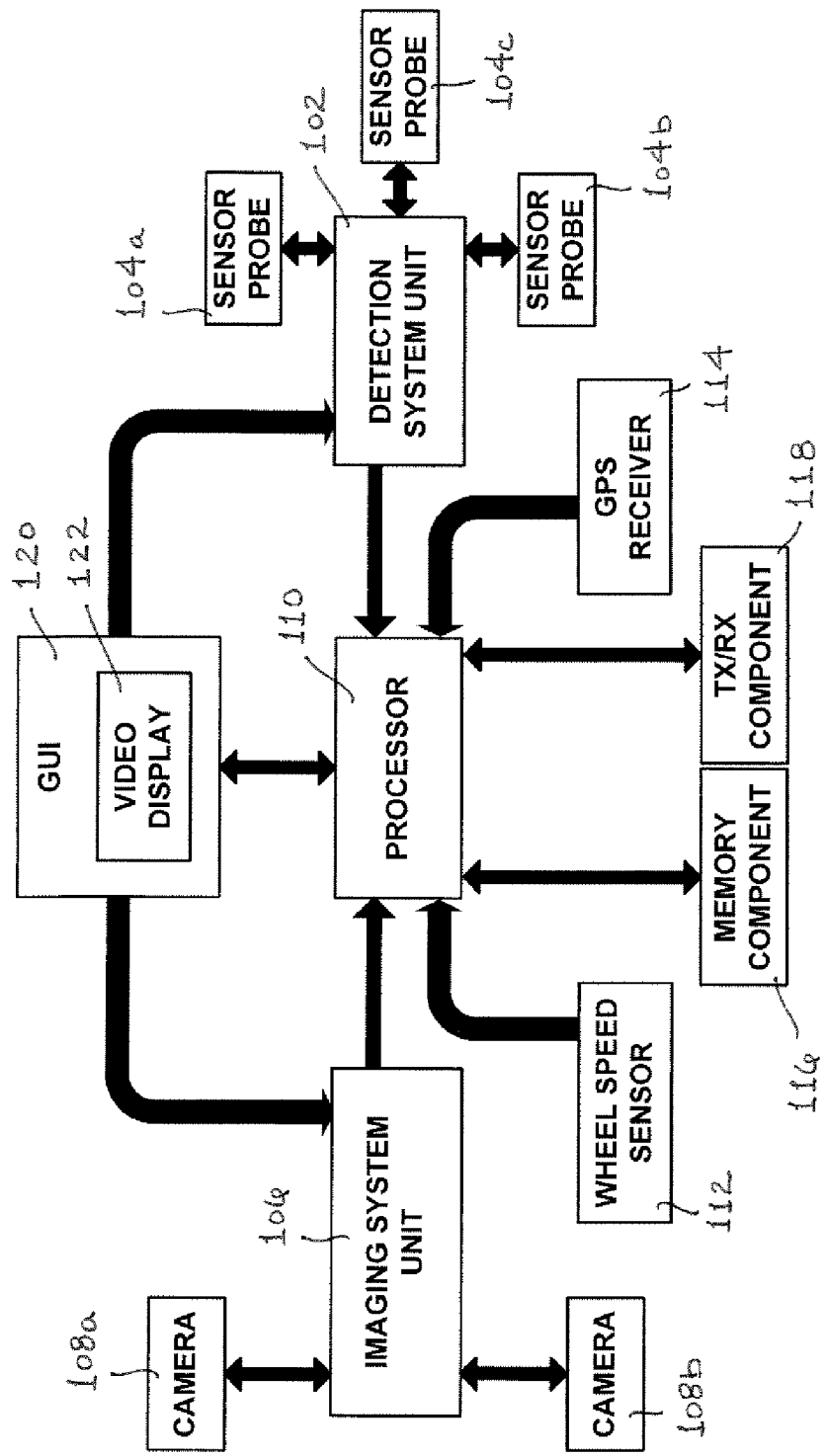
FIG. 1 illustrates a block diagram of an exemplary apparatus suitable for implementing the stray voltage detection methods employed in accordance with an embodiment of the present invention.

An exemplary apparatus 100 for implementing the present invention is illustrated in FIG. 1. In accordance with a preferred embodiment of the present invention, apparatus 100 is comprised of a detection system unit (DSU) 102, which may receive electric field measurements from sensor probes 104a, 104b and 104c. DSU 102 may employ any number of sensor probes for purposes of measuring an electric field in any particular area of interest being surveyed for stray voltage anomalies. For example, DSU 102 may employ only one of said sensor probes 104a, 104b or 104c, additional sensor probes to supplement the measurements obtained by sensor probes 104a, 104b and 104c or, alternatively, any other suitable combination of sensor probes. In yet another embodiment, DSU 102 may employ a multi-axis sensor probe arrangement as the ones described, for example, in commonly owned U.S. Pat. No. 7,248,054, issued Jul. 24, 2007, and U.S. Pat. No. 7,253,642, issued Aug. 7, 2007, which are hereby incorporated by reference in their entirety.

Apparatus 100 of FIG. 1 is additionally comprised of imaging system unit (ISU) 106, which may receive video input from cameras 108a and 108b. Similar to DSU 102, ISU 106 may employ any number of cameras suitable for providing streaming images of a patrolled scene. Cameras employed in apparatus 100 may be video cameras, stereo cameras, various digital cameras, a combination of the aforementioned cameras or any other suitable camera and arrangement of cameras suitable for imagining a patrolled scene.

One or more of cameras 108 may be provided for imaging the environs where apparatus 100 is employed. Specifically, where apparatus 100 is deployed on a patrol vehicle or trailer (not shown), cameras 108a and 108b may be provided thereon, wherein camera 108a is directed to view in a direction about 90° to the left of the direction of travel and camera 108b is directed to view about 90° to the right of the direction of travel, so that images of what is present to the left and to the right of the patrolling vehicle are obtained. Video images therefrom may be recorded as apparatus 100 traverses a patrolled environment.

Video images may be obtained at a standard video rate, e.g., at 30 or 60 frames per second, but may be at much slower rates, e.g., one or two frames per second, consistent with the speeds at which the patrolling vehicle moves. For example, if a vehicle is moving at between 10 and 20 mph (about 14-28 feet per second or about 4.2-8.5 m/sec.), video at a two frames per second video rate would provide a new image for approximately each 14 feet (about 4.2 m) or less of travel, which should be sufficient to identify the location at which the stray voltage was detected.

The video images may all be recorded (stored) or only selected images may be recorded. In one exemplary embodiment, video images are stored in a video frame data buffer having a capacity to store a substantial number of frames of video data, e.g., frames representing about thirty (30) seconds of video scenes. As each new frame is stored, the oldest previous frame is lost. Thus, the video data buffer contains video frames for the most recent thirty seconds. Video buffers storing frames representing a longer period of time, or even a shorter period of time, may be employed. For example, a "frame grabber" card, in the form of a PCMCIA card or an internal card, may be employed to synchronize processed electric field data DSU 102 with processed video data from ISU 106.

DSU 102 and ISU 106 are coupled to a processor 110. DSU 102 and ISU 106 may perform preprocessing of signals received, respectively, from sensor probes 104a-104c and cameras 108a-108b or, as previously described, any alternative arrangements of sensor probes and cameras prior to transmitting data to processor 110. Processor 110 coupled to DSU 102 and ISU 106 is capable of processing sensor probe measurement data and corresponding video frame data in near real time (e.g., with less than one second latency). For example, processor 110 may be arranged to interface directly to a three-axis stray voltage sensing probe arrangement, as described in commonly owned U.S. Pat. No. 7,248,054, issued Jul. 24, 2007, and U.S. Pat. No. 7,253,642, issued Aug. 7, 2007. Processor 110 may include a plurality of electronic components (not shown) such as a multi-channel analog-to-digital converter (ADC), a digital signal processor (DSP), a memory e.g., an EEPROM), an audio amplifier, audible transducing device (e.g., a loudspeaker), one or more data converters (e.g., uni-directional or bidirectional SPI to RS-232 converters), a source of electrical power (e.g., a power converter operating from a vehicle power system) or any other applicable electronic processing component.

In addition to DSU 102 and ISU 106, a wheel speed sensor 112, a global positioning system (GPS) receiver 114, a memory component 116, a transceiver component 118 and a graphical user interface (GUI) 120 may also be coupled to processor 110. Data pertaining to the speed and distance of travel of a patrolling vehicle may be provided to processor 110 by wheel speed sensor 112. Wheel speed sensor 112 is employed in the processing of electric field data to facilitate signal processing while apparatus 100 is in motion as described herein.

Data pertaining to the position of a patrolling vehicle equipped with GPS receiver 114 may be provided to processor 110 to determine exact locations of the patrolling vehicle's path of travel at the time particular electric field measurements were received. GPS receiver 114 may be configured to provide a location reference including latitude, longitude, elevation, time and date about once per second so that the location is known to a reasonably high precision. GPS position data may be exported to a conventional GPS mapping software for utilization and then stored, for example, in memory component 116, so that there is a stored precision location and time reference associated with the stored electric field measurements. Memory component 116 may additionally be utilized to store, temporarily or permanently, other data pertaining to electric field measurements, video images or any other data associated with the stray voltage detection process described and referenced herein.

Since apparatus 100 may be operated in urban/city environments where buildings and other obstacles distort and/or block signals from a GPS satellite system from reaching GPS receiver 114 via a direct path, GPS location information may have degraded accuracy, or may not be available. In those cases, wheel speed sensor 112 may be provided as a suitable substitute for highly accurate GPS location information, or may be utilized in conjunction therewith.

Thus, the GPS location data provides a record of the location at which each detected stray voltage anomaly was detected and the time thereof as may be desired for subsequent analysis, for example, for reviewing the location of the anomaly and identifying the emitting source in the patrolled environment. Since the peak of a response to a source of stray voltage can not be ascertained until after the patrolling vehicle has passed the source, the exact location of the source may not be observed until after the time at which it is detected (i.e. until after it is passed). While having this stray voltage and location data recorded is desirable and beneficial, in a typical service environment, e.g., on a city street, it is not practical to stop the patrolling vehicle carrying apparatus 100 each time a stray voltage is detected, or to back the vehicle up to ascertain the exact location at which the detection took place.

Transceiver component 118 may be configured to transmit and receive data transmissions to and from remote transceivers. Transceiver component 118 may be transceivers of the type that are compatible with Wi-Fi standard IEEE 802.11, BLUETOOTH™ enabled, a combination of local area network (LAN), wide area network (WAN), wireless area network (WLAN), personal area network (PAN) standards or any other suitable combination of communication means to permit robust wireless transmission of data. For example, transceiver component 118 may be a BLUETOOTH™ enabled device, thereby providing a means for communicating stray voltage related information between mobile apparatus 100 and a remote device, such as a personal digital assistants (PDAs), cellular phones, notebook and desktop computers, printers, digital cameras or any other suitable electronic device, via a secured short-range radio frequency. Thereafter, a utility member equipped with the remote device configured to receive the stray voltage related communication may be dispatched to a site determined to have a potential stray voltage anomaly for purposes of neutralizing the anomaly. It should be noted that the aforementioned are provided merely as exemplary means for wireless transmission of stray voltage related data. Other suitable wireless transmission and receiving means may be employed in the present invention.

An optional laptop computer (not shown) or other suitable computing system having a display provides GUI 120 for an operator to control the operation of apparatus 100, particularly measurement and processing components associated with sensor probes 104, and to monitor electric field data as measured. For example, an operator may adjust the values of the constants and scaling factors utilized in the detection and averaging processing for producing an audible alarm (described in detail below). The laptop computer may also provide a convenient means for storing a record or log of the measured field and location (GPS) data for subsequent review and/or analysis, as might be desired for determining when and where a stray voltage anomaly existed.

GUI 120 receives data, directly or indirectly, from various components described in conjunction with apparatus 100 and, accordingly, displays them to the operator for purposes of controlling and monitoring the detection of stray voltage anomalies present in patrolled areas. GUI 120 is a video based interface having a video display 122. The data provided to GUI 120 provides the interface operator with an opportunity to visually monitor and analyze incoming data measured by a stray voltage detection system on video display 122.

Figure 2:
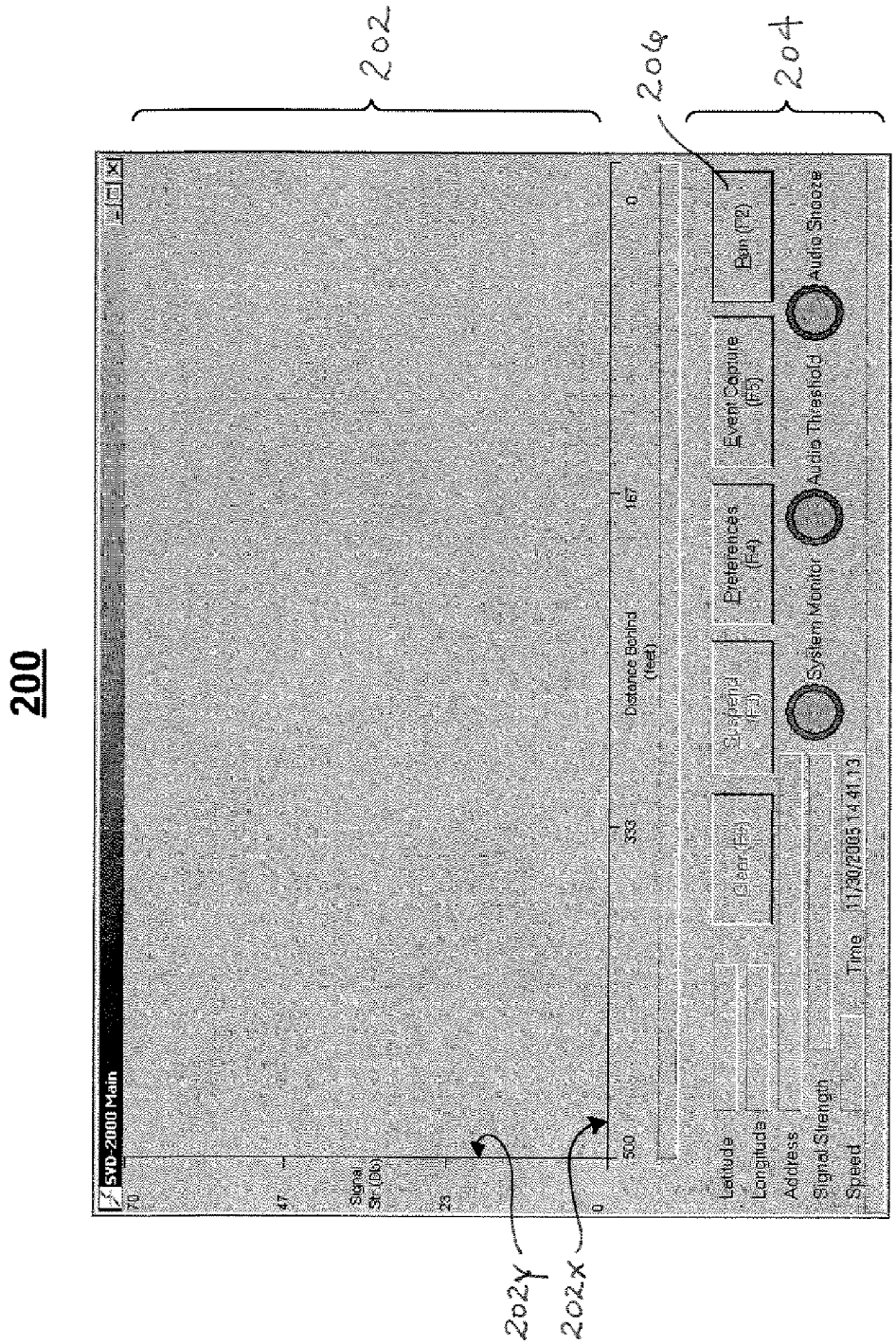
FIG. 2 illustrates an exemplary login display produced by a system in accordance with an embodiment of the present invention.

FIGS. 2-13 illustrate exemplary displays that may be provided on video display 122 of GUI 120 for monitoring and controlling the operation of apparatus 100. As previously described, GUI 120 is provided on a computer, preferably a laptop computer for purposes of mobility. Upon start up of GUI 120 of apparatus 100, for example, by selecting or clicking an icon displayed on the "desktop" provided on a monitor display of a computer, a computer program for providing GUI 120 will initialize a main display 200, as illustrated in FIG. 2. Main display 200 provides an interface user with a real-time monitoring environment of the area being patrolled for stray voltage anomalies. Main display 200 may be comprised of a video display 202 and a control panel 204. Real-time electric field measurements and video frames of the patrolled environment may be provided in video display 202, which is supplemented with a graphical plot having an x-axis 202x indicative of the linear distance traveled by the patrol vehicle versus a y-axis 202y indicative of the signal strength of the measured electric field associated with various locations of the patrol vehicle. In order to initiate the detection and monitoring system of apparatus 100, the interface user may select a run command option 206 provided on display 200.

Run command option 206, when selected, will prompt for information to be entered in an initial identification screen. The initial identification screen may be, for example, system login display 300 of FIG. 3. System login display 300 may request an the interface operator to provide a username in field 302, a patrol vehicle name in field 304 and a patrol vehicle number in field 306 for purposes of authorizing access to the operational and monitoring controls of apparatus 100. When the required information has been provided by the interface operator in fields 302, 304 and 306, the interface operator may then select login command option 308 to proceed with system verification of authorized access to apparatus 100. Similarly, the interface operator may select cancel command option 310 to terminate login procedures for apparatus 100.

Figure 4:
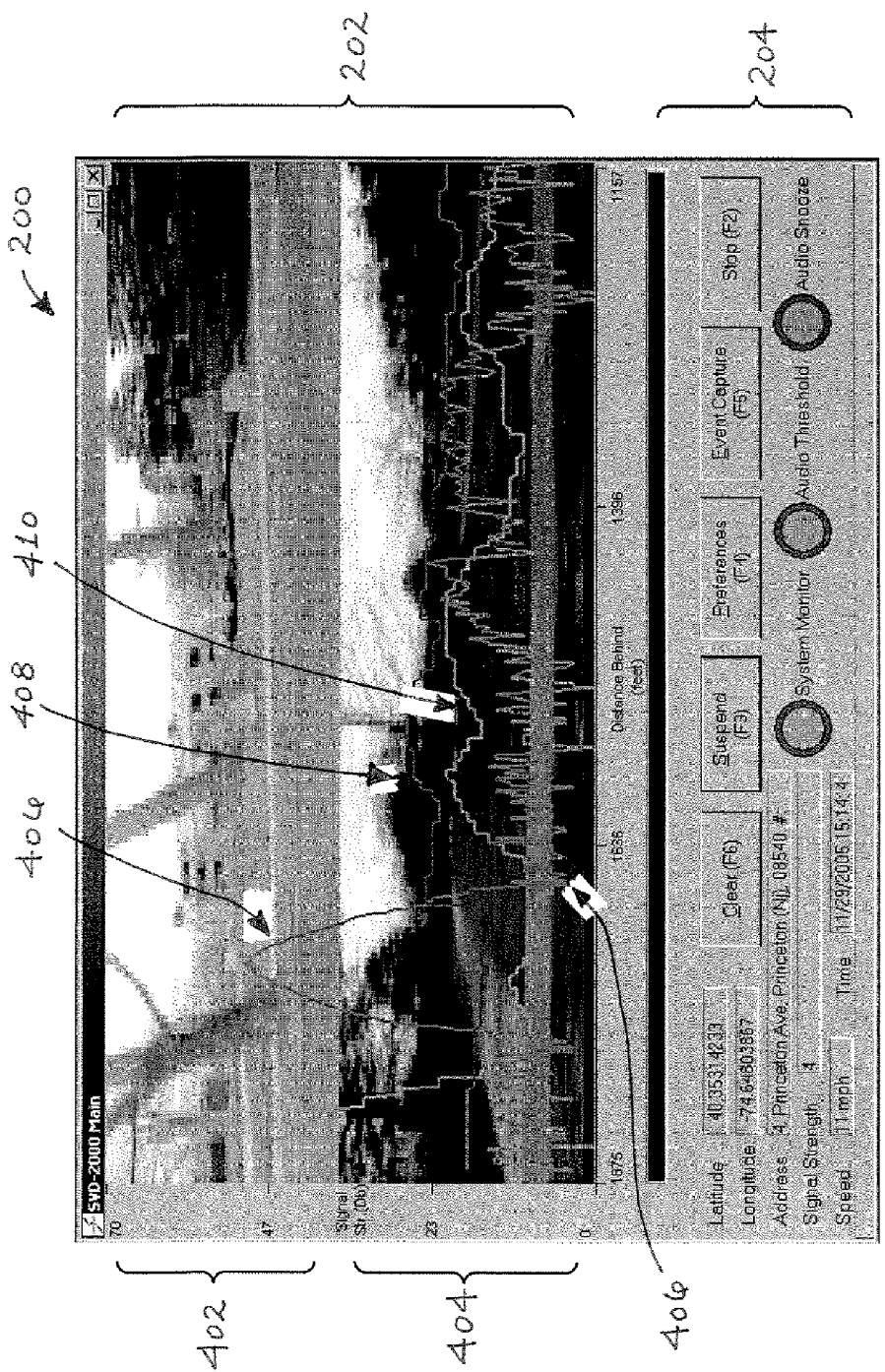
FIG. 4 illustrates the main display of FIG. 2 depicting streaming data of measured electric fields and corresponding video images of a patrolled scene in accordance with an embodiment of the present invention.
Figure 5:
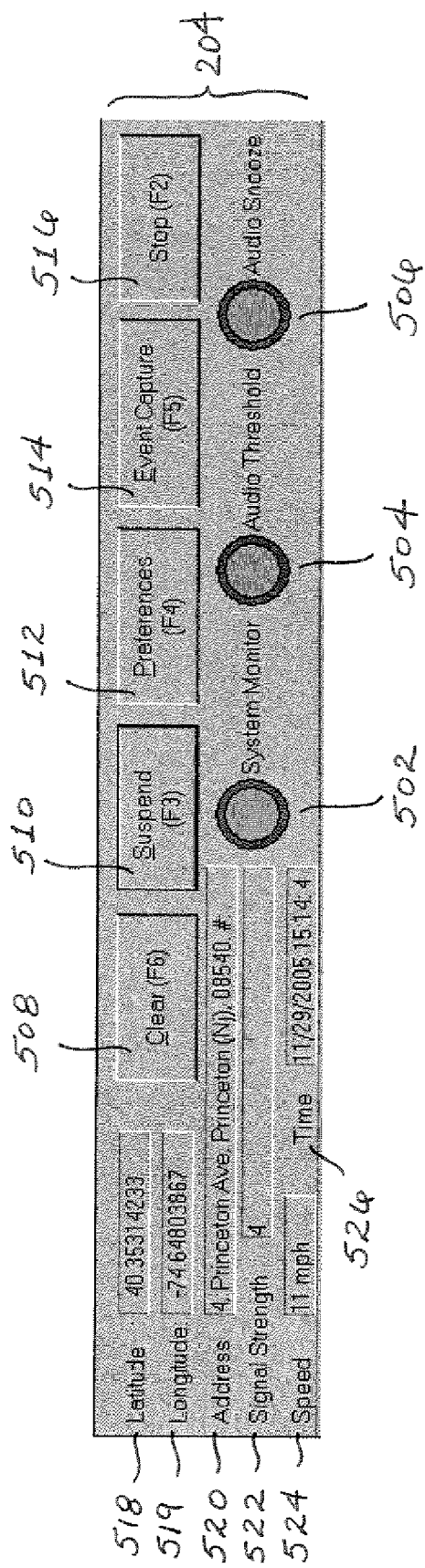
FIG. 5 illustrates an exploded view of an exemplary monitoring control panel provided on the main displays of FIGS. 3 and 4 in accordance with an embodiment of the present invention.

Upon a successful login at display 300, data sampling is initiated and main display 200 is populated with sensor data, as illustrated in the main display of FIG. 4. Sensor data is provided on video display 202, which may be provided in a split screen format for displaying multiple video image frames (one from each camera). A split screen view 402 may display video image frames received from camera 108a, while a split screen view 404 may display corresponding video image frames received from camera 108b, or vice versa. For example, a patrol vehicle may be equipped with cameras 108a and 108b positioned on opposing sides for providing corresponding video image frames from both sides of the patrol vehicles path of travel. Although main display 200 of FIG. 4 is shown with two split screens 402 and 404, additional split screens may be incorporated into video display 202 for an apparatus utilizing more than two cameras.

Three plot lines, a raw electrical field measurement plot 406, an adaptive threshold plot 408 set relative to the local ambient or background noise level and a smoothed plot 410 are provided in conjunction with the graphical plot overlaid on the video image frames displayed on video display 202. Adaptive threshold plot 408 is generated from data gathered before and after the raw voltage was sensed by sensor probes 104a-104c. Smoothed plot 410 is a smoothed version of plot 406 that has been filtered to remove spurious content. A potential stray voltage is indicated when smoothed plot 410 exceeds adaptive threshold plot 408.

Control panel 204 of main display 200 provides the interface operator with a plurality of monitoring and control options. An enlarged view of control panel 204, as illustrated in FIG. 4, is provided and described in connection with FIG. 5. Control panel 204 may include a system monitor indicator 502, an audio threshold indicator 504 and an audio snooze indicator 506. In addition, a clear command option 508, a suspend command option 510, a preferences command option 512, an event capture command option 514 and a stop command option 516 are provided to the interface operator in control panel 204. Control panel 204 may also provide information in a latitude display 518, a longitude display 519, an address display 520, a signal strength display 522, a speed display 524 and a time stamp display 526.

Indicators 502, 504 and 506 may be visual indicators, configured to change color or blink upon satisfaction of pre-programmed criteria. System monitor indicator 502 may be a green color when operating within system specifications. When a problem is detected in connection with GUI 120, system monitor indicator 502 may turn yellow to notify the interface operator that their exists a problem, such as, lack of a GPS signal. In this case, no latitude, longitude or address information may be shown, respectively, in displays 518, 519 and 520. Another potential trigger indicative of a problem is lack of video or electric field measurement data, wherein there would be no video image frame or measurement readings on video display 202. Other potential problems that may trigger indicator 502 may be depleted disk space for recording captured events (described in detail below) or loss of communication between processor 110 and GUI 120.

Generation of an audible tone output signal having a pitch that is proportional to the signal strength of the measured electric field may be provided as a tool in conjunction with the monitoring capabilities provided in GUI 120 to aid the interface operator in determining the source and potential danger of stray voltage anomalies. An audio threshold value that is indicative of the minimum voltage level required to trigger an audible notification tone is desired. For example, an optimum audio alert value for identifying stray voltage anomalies, while minimizing the number of false detections, may be preset as a default value. Default settings may be represented by audio threshold indicator 504 being, for example, a green color.

Figure 6:
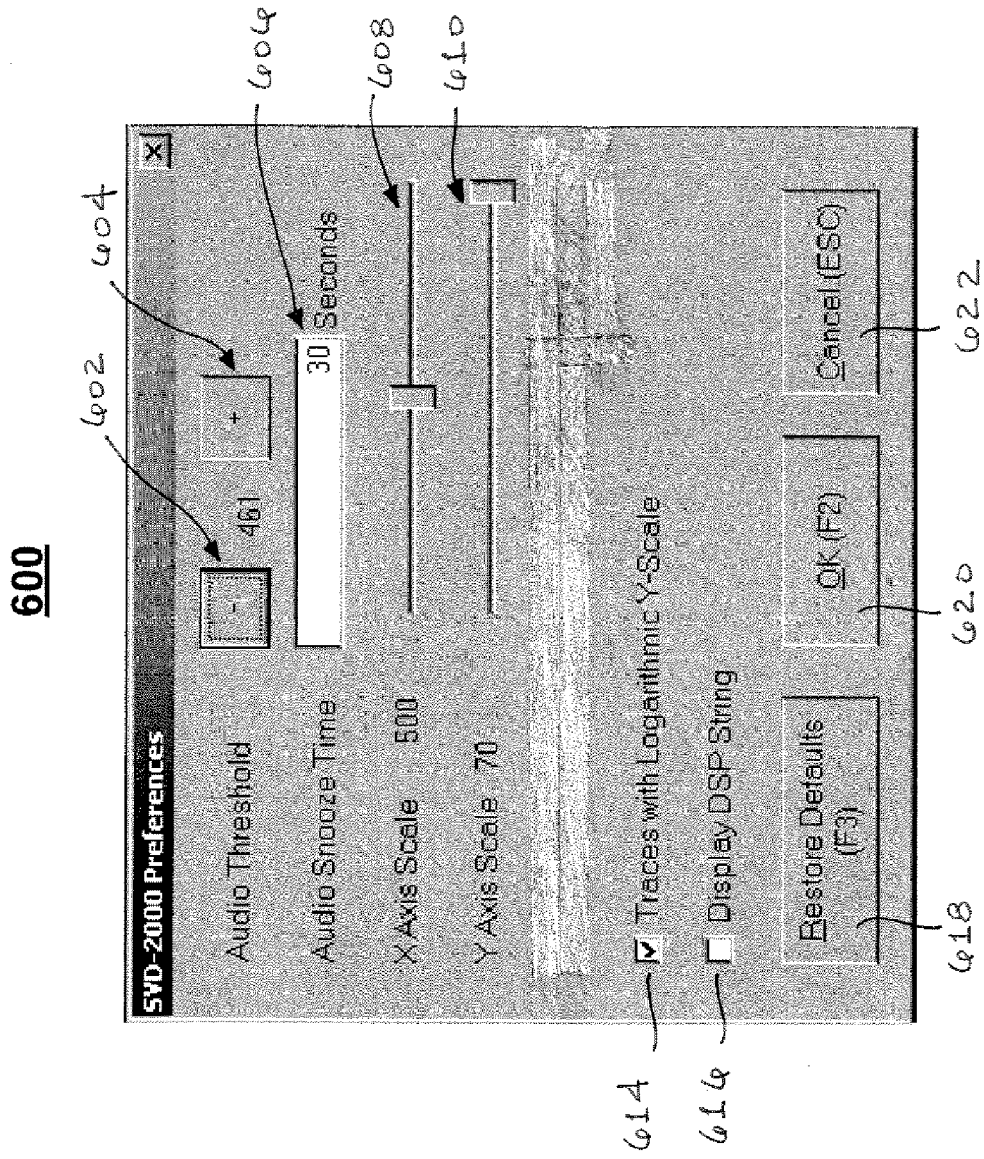
FIG. 6 illustrates an exemplary standby display produced by the system upon selection of an event capture option provided on the main displays of FIGS. 3 and 4 in accordance with an embodiment of the present invention.
Figure 7:
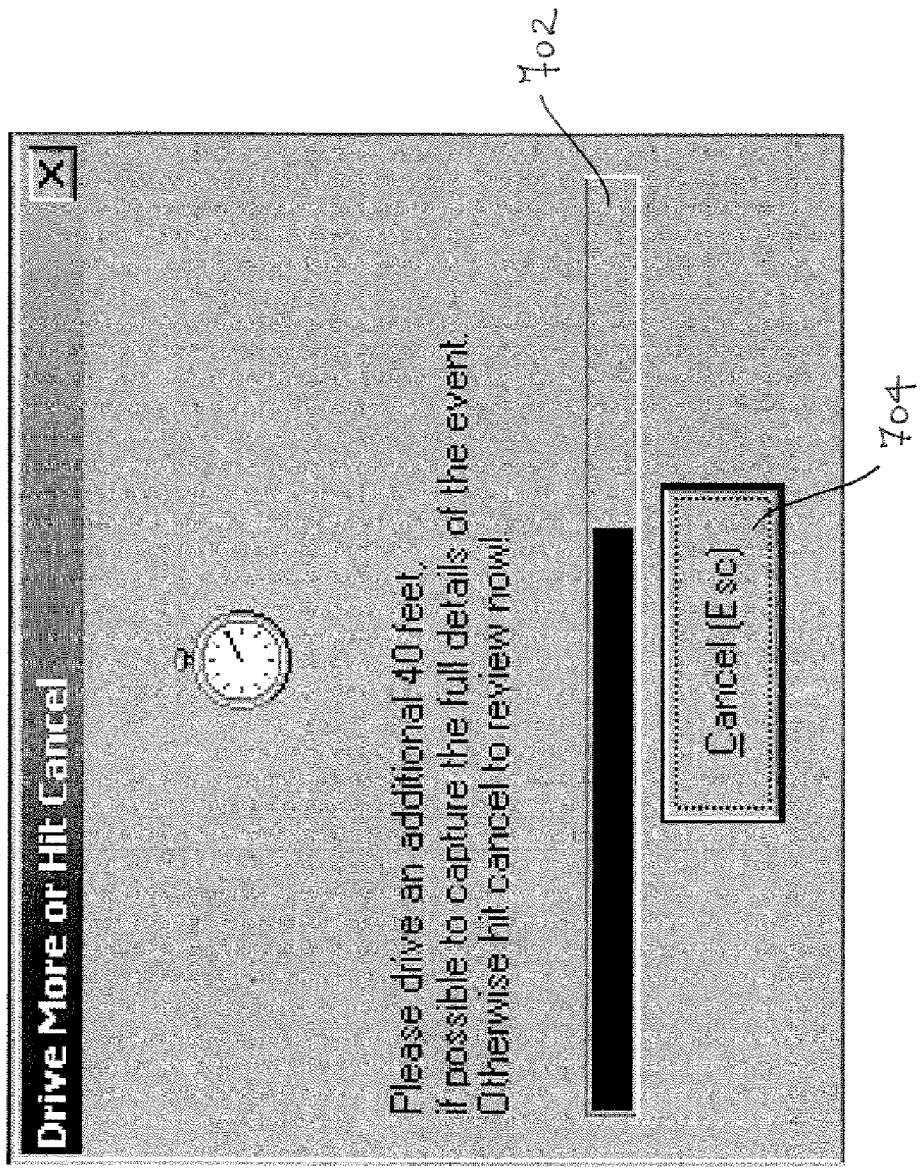
FIG. 7 illustrates an exemplary event capture display produced by the system upon completion of the processing for a request to capture an event in accordance with an embodiment of the present invention.

However, the interface operator may adjust the default threshold settings provided in connection with the audible notification tone if too much noise is being picked up. By selecting preferences command option 512 provided on control panel 204, the interface operator could be provided with a preferences display 600, as illustrated in FIG. 6, for modifying values associated with the audible tone. Therein, the interface operator could raise the threshold value, using audio threshold increase button 602 and decrease button 604, to minimize or eliminate false audible tones being generated due to a noisy environment in a patrolled environment. Any changes made to the default audible threshold value in preferences display 600 may be represented by audible threshold indicator 504 on control panel 204 turning yellow. The change in color informs the interface operator that the audible notification tone is operating according to user defined values, not system defined default values.

Additional features that may be provided in preferences display 600 of FIG. 6, may be an audio snooze time option 606, an x-axis toggle switch 608, a y-axis toggle switch 610, a trace option 614 and a DSP string option 616. Audio snooze time option 606 specifies in seconds how long audio alerts are suspended when a snooze button 506 is pushed. Snooze button 506 may be green when default values are provided in the display of snooze time option 606 of preferences display 600. However, similar to audio threshold indicator 504, snooze button 506 may also include a color indicator that changes, for example, to yellow when the default snooze time has been changed in preferences display 600. Toggle switches 608 and 610 permit the interface operator to adjust, respectively, the scale used in x-axis 202x, which measures in feet the distance traveled since the last event capture, and y-axis 202y, which measures in decibels the electric field signal strength, on video display 202. Trace option 614, when selected, allows for the logarithmic scaling of all y-axis 202 values in order to ensure that values are easily readable and that entire plot lines appear within video display 202 of main display 200. DSP string option 616 may be provided as a means for displaying processing related data, when selected, to troubleshooting apparatus 100.

Default values for system preferences identified in display 600 may be restored by selecting a restore defaults command option 618. Otherwise defined preferences may be saved and executed by selecting an "OK" command option 620. Alternatively, if the interface operator decides not to make any changes, then a "CANCEL" command option 622 may be selected. Selection of either command option 620 or 622 will return the interface operator to display 200.

As the patrol vehicle traverses through an environment, streaming synchronized data of the electric field strength overlaid on the corresponding video frames of the scene being traversed at the time of measurement may be displayed to the interface operator on video display 202 of main display 200. In addition, corresponding latitude and longitude information related to the patrolling vehicle is received by GPS receiver 114 and provided, respectively, to display fields 518 and 519. An address corresponding to the latitude and longitude readings provided in display fields 518 and 519 may also be provided in display field 520. A signal strength value may be provided in display field 522. The speed of the patrol vehicle may be presented in display field 524, along with a current data and time stamp in display field 526. The interface operator may temporarily suspend data sampling at any time by selecting a suspend command option 510, clear received data by selecting a clear command option 508 or exit GUI 120 system entirely by selecting a stop command option 516 provided on control panel 204 of main display 200.

As the interface operator monitors the incoming streaming data on video display 202, he/she is also presented with a variable-pitch alert that is configured for alerting the interface operator of detected fluctuations and/or spikes in measured electric field readings that exceed a defined threshold. Therefore, when a potential anomaly is detected, represented for example by a rise-peak-fall in the alert pitch, a corresponding visual spike in raw voltage plot 406, a high signal strength value in display field 522 or a combination thereof, interface operator may select an event capture command option 514 for purposes of gathering additional information to review the potentially detected stray voltage anomaly. Therefore, when the interface operator selects event capture command option 514 on control panel 204 of main display 200, he/she may be presented with a data collection display 700 and a event capture display 800 illustrated, respectively, in FIGS. 7 and 8. Data collection display 700 prompts the interface operator to continue driving the patrol vehicle for a predefined distance (e.g., an additional 40 feet after selection of event capture command option 514) in order to collect enough data sampling information to fully analyze the background noise associated with the captured event. A progress bar 702 may be provided in display 700 to inform the interface user of the remaining distance of travel required. Upon completion of the additional information collection process, represented by progress bar 702, the interface operator may stop the collection of streaming data by GUI 120 and proceed to event capture display 800 for analyzing the captured event. The collection of streaming data may be stopped or paused by stopping the patrol vehicle. Alternatively, collection of additional information pertaining to the captured event may be optionally terminated earlier, through selection of a cancel command option 704, to permit the interface operator to proceed to review the captured event on event capture display 800 without collection of additional information.

Figure 8:
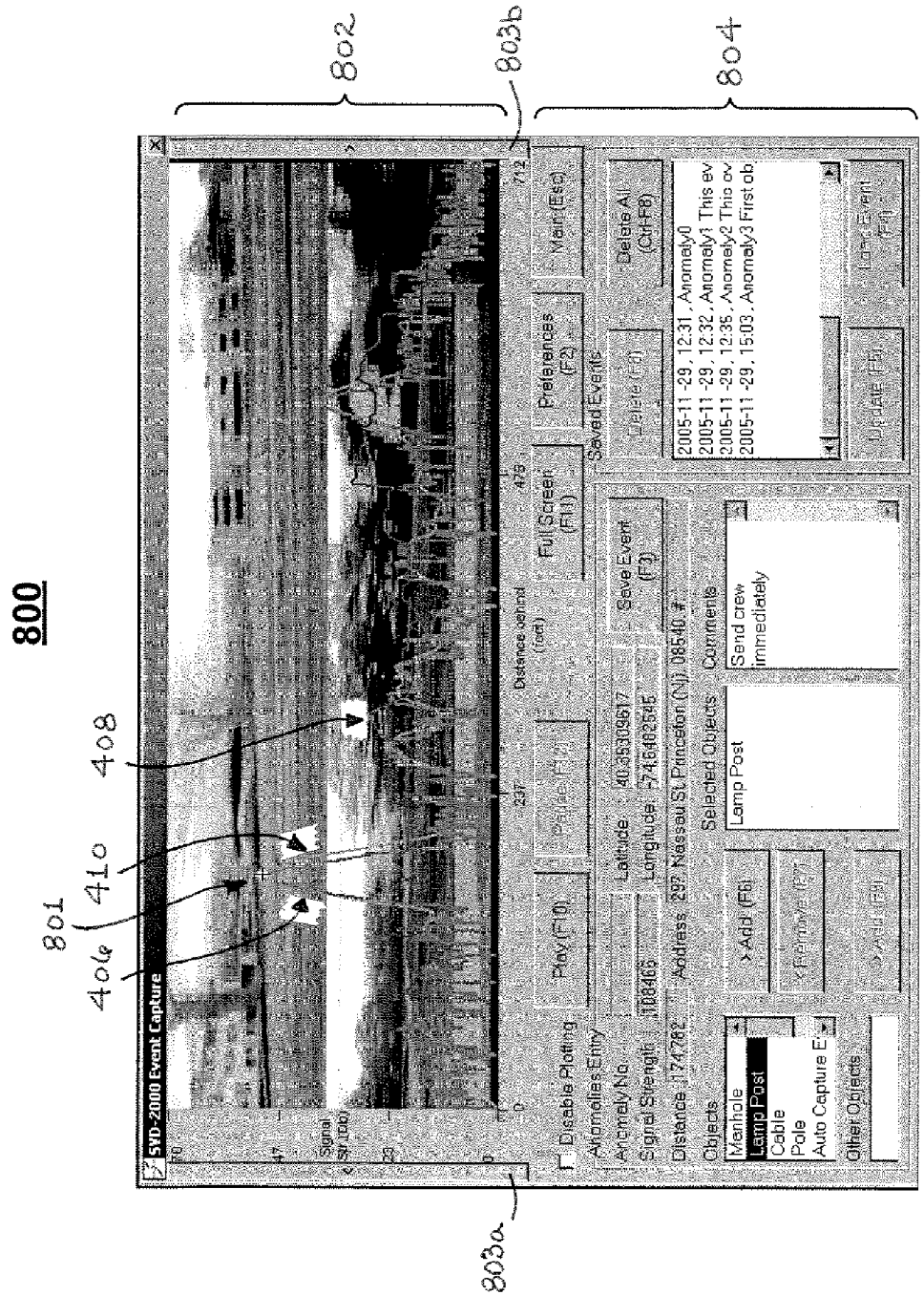
FIG. 8 illustrates an exploded view of plotted electric field measurements and a location indicator provided on the playback display of FIG. 7 in accordance with an embodiment of the present invention.

After driving the additional distance prompted by display 700 and stopping the patrol vehicle, processing of data related to the event capture may be processed (e.g. by processor 110) and a second distinctive alert tone (e.g., a chime-like sound) may be presented to the interface operator if it is determined that the processed captured measurement is not a false alarm. Thereupon, the interface operator could further examine the potential detected anomaly in event capture display 800, as illustrated in FIG. 8. Similar to main display 200, event capture display 800 provides a video display 802 and a playback control panel 804. Scene scroll tabs 803a and 803b may be provided on opposing sides of display 802 to permit the interface operator to view captured video images and their corresponding electric field measurements throughout various positions traversed by the patrol vehicle. Event capture display 800 may also provide a pinpoint indicator 801 that may be positioned on any part of the video display 802 to display data and video for a different location. Data displayed in playback control panel 804 (to be described below) corresponds to the applied position of indicator 801. For example, if the interface operator would like to view measurement and video data associated with a position 225 feet prior in motion, the interface operator could use scene scroll tabs 803a and 803b to move pinpoint indicator 801 to the desired location on video display 802.

Event capture display 800 allows the interface operator to more closely examine potentially detected anomalies by providing playback analysis of the captured event. More specifically, the interface operator may compare raw voltage plot 406 and adaptive threshold plot 408 to assist in identifying the object displayed in the corresponding image frame that is most likely to be the source of the anomaly. In event capture display 800, the three plot lines may be aligned to permit the interface operator to look for points where smoothed plot 410 exceeds adaptive threshold plot 408. This indicates that there exists a spike above the averaged background noise and, therefore, the existence of an anomaly.

Figure 9:
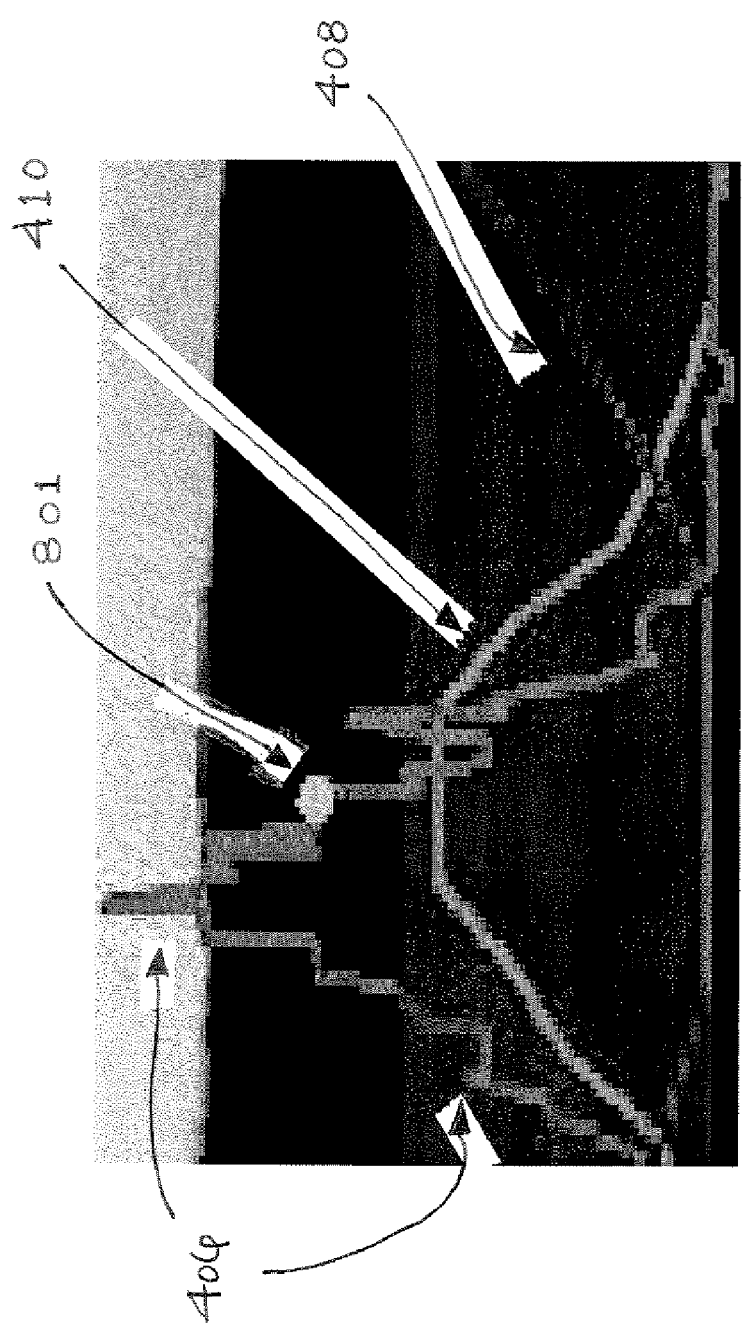
FIG. 9 illustrates an exploded view of plotted electric field measurements and a potentially electrified source provided on the playback display of FIG. 7 in accordance with an embodiment of the present invention.
Figure 10:
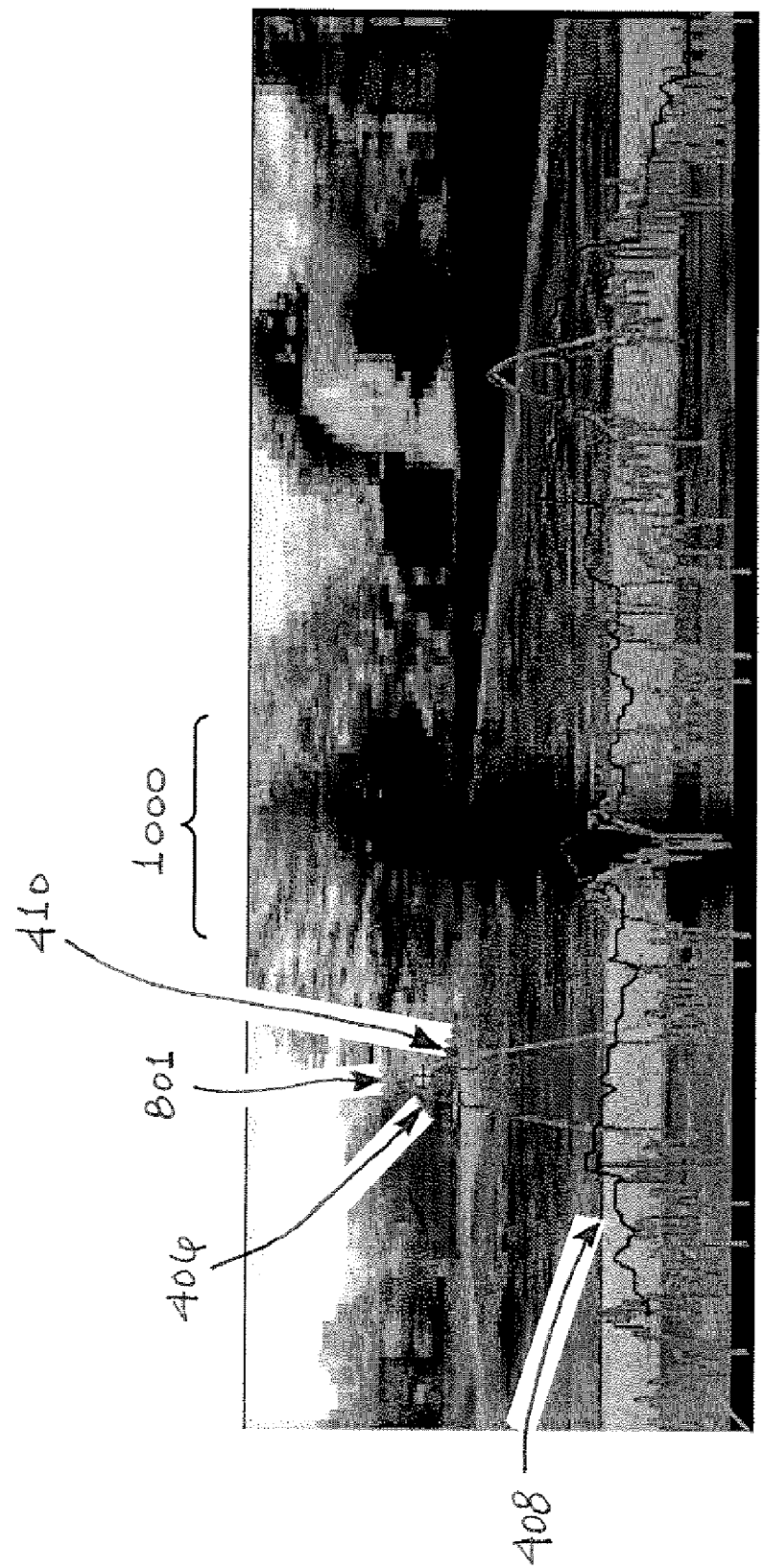
FIG. 10 illustrates an exploded view of an exemplary playback control panel provided on the event capture display of FIG. 7 in accordance with an embodiment of the present invention.

Enlarged views of a detected stray voltage anomaly as it may be provided on video display 802 of event capture display 800 of FIG. 8 is illustrated in conjunction with FIGS. 9-10. In FIG. 9, pinpoint indicator 801 is positioned near the peak of spike in raw voltage plot 406. All related sensor data related to this particular position is provided to the interface operator on playback control panel 804. As can be seen near the spike in raw voltage plot 406, smoothed plot 410 exceeds adaptive threshold plot 408, indicative of a potentially dangerous anomaly in the captured scene. When pinpoint indicator 801 is positioned over the peak of a spike, the object most centered in a video frame on video display 802 is likely the source of the detected anomaly. An isolated enlarged view, as illustrated in FIG. 10, of the video image frame shown on video display 802 of event capture display 800 may be provided, wherein it can be seen that an object 1000 most centered in the video frame is likely the source of the detected anomaly. The video image frame may be isolated and enlarged by selecting a full screen command option 1106 (FIG. 11) from playback control panel 804.

Figure 11:
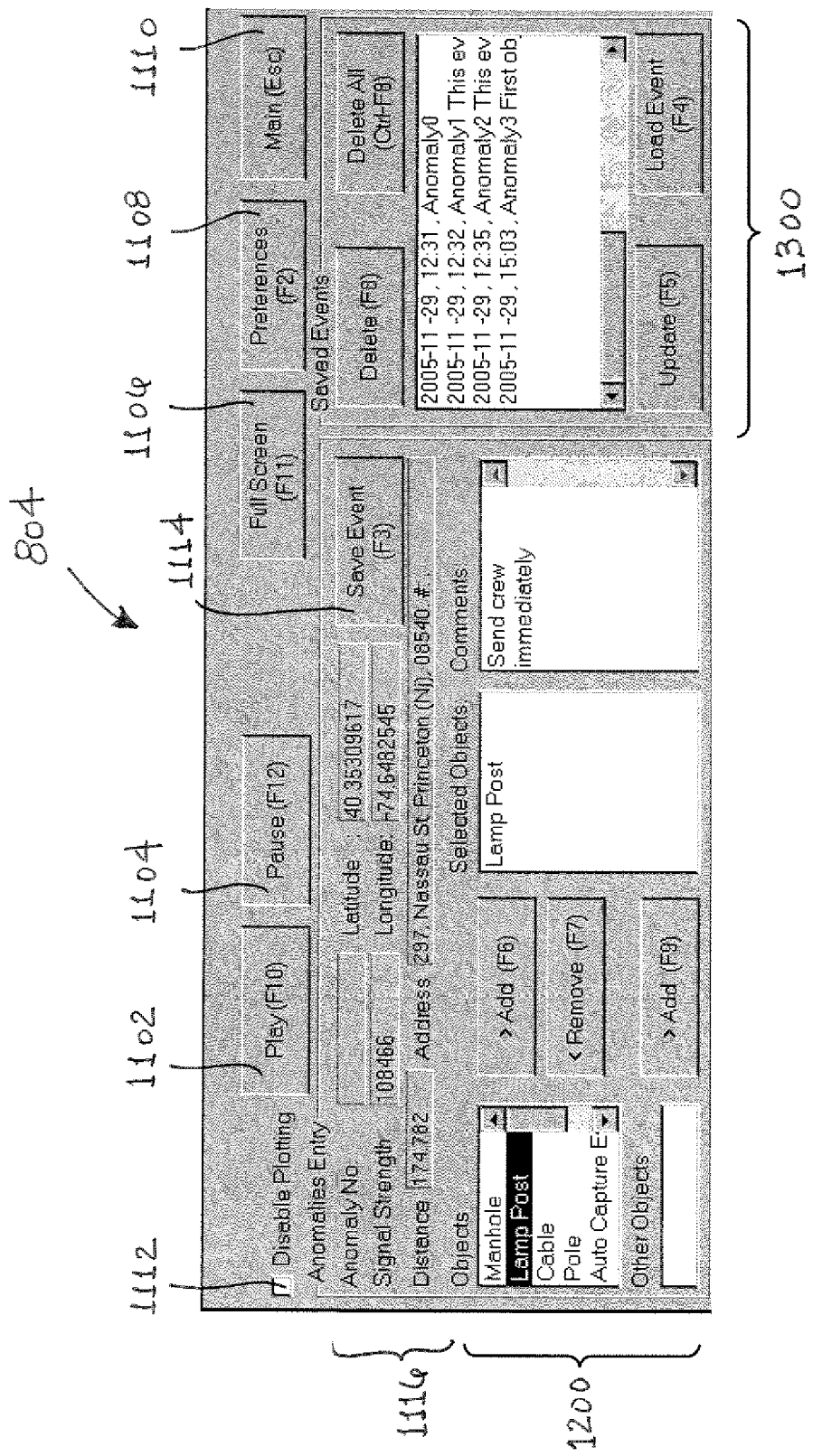
FIG. 11 illustrates an exploded view of an exemplary anomaly identification sub-panel provided on the playback control panel of FIG. 10 in accordance with an embodiment of the present invention.
Figure 12:
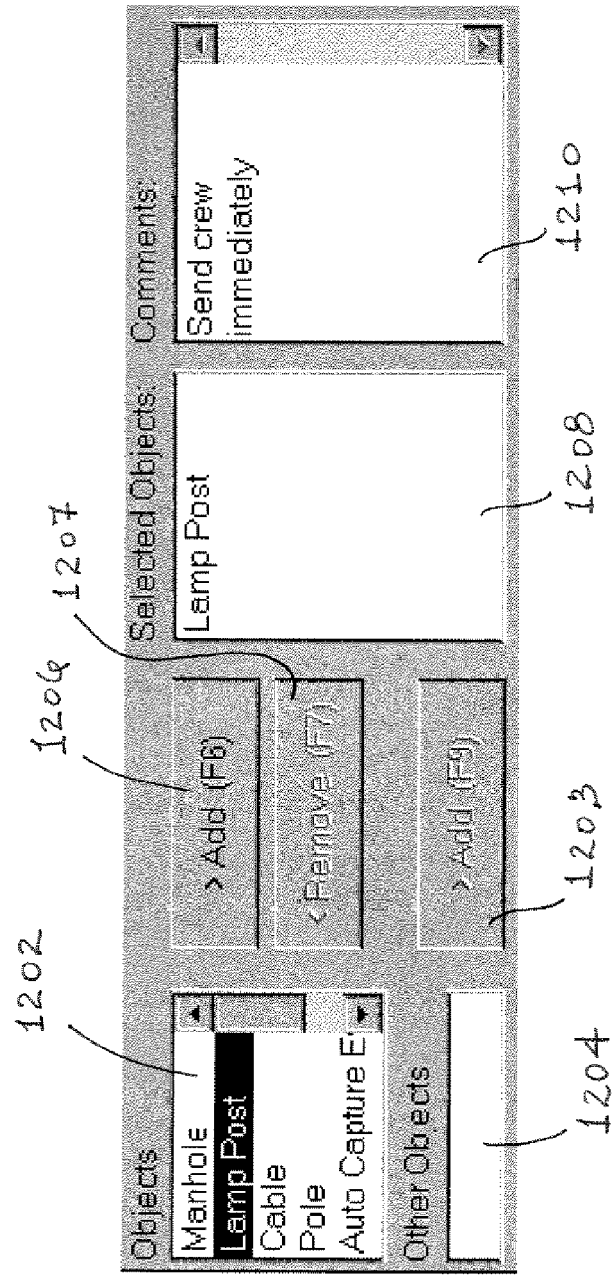
FIG. 12 illustrates an exploded view of an exemplary event log sub-panel provided on the playback control panel of FIG. 10 in accordance with an embodiment of the present invention.
Figure 13:
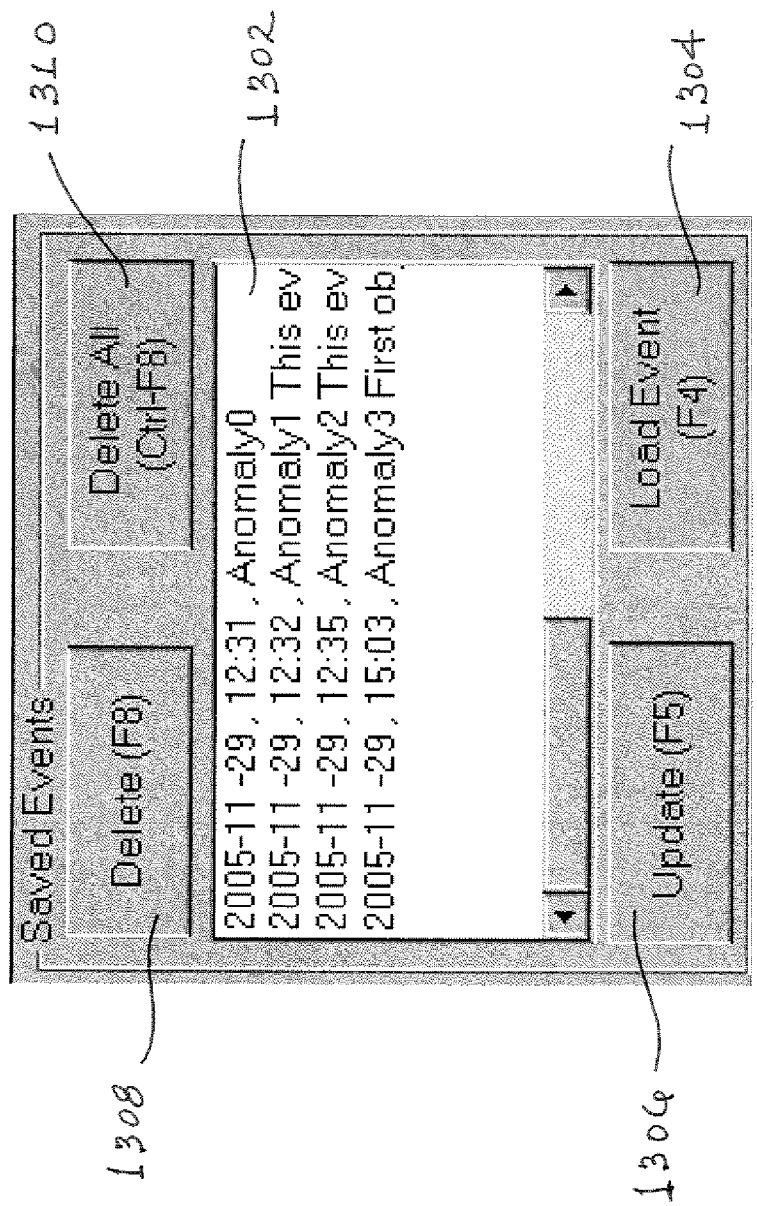
FIG. 13 illustrates an exemplary preferences display produced by the system upon selection of a preferences option provided on the displays of FIGS. 3, 4 and 6 in accordance with an embodiment of the present invention.

An enlarged view of event capture control panel 804 is illustrated in FIG. 11. Event capture control panel 804 is comprised of a play command option 1102, a pause command option 1104, a full screen command option 1106, a preferences option 1108 and a main display option 1110. Play command option 1102 may allow the interface operator to play a video clip selected from a saved events section 1300. Similarly pause command option 1104 may allow the interface operator to pause playback of the video clip selected from saved events section 1300. Full screen command option 1106 may allow the interface operator to toggle between full-sized video images and regular-sized video images provided on display 802. Preferences command option 1108 may provide the interface operator with additional playback and review options not shown on playback control panel 804. For example, command option 1108, when selected, may provide preferences related to wireless communication of captured events to dispatch a remote crew. Main display option 1110 may allow the interface operator to return to main display 200. A disable plotting option 1112 may also be provided, wherein the plots may be removed for a clearer view of scene objects displayed on video display 802 when option 1112 is selected.

Once a detected stray voltage anomaly has been confirmed by the interface operator and object 1000, for example, has been determined to be the likely source of the anomaly, the interface operator may then proceed to record object related information in an objects section 1200 of playback control panel 804. An environmental object or infrastructure name may be listed in a predefined objects scroll menu 1202 or may be defined by the interface operator using an object identification field 1204. The interface operator may then add the object identified in menu 1202 or field 1204 to a selected object field 1208 using, respectively, an add command option 1206 or an add command option 1203. An added object identified in field 1208 may also be removed by selecting a remove command option 1207. Additional notes, comments and instructions may be provided by the interface operator using a comments field 1210. For example, the interface operator may identify a lamp post, in field 1208, as the potential source of a detected stray voltage anomaly and instruct, in field 1210, the need for a utility crew to be dispatched immediately to the site to neutralize the source. In addition, GUI 120 is configured so that if multiple objects are determined to be present in a scene where an anomaly was detected, the interface operator may identify the multiple objects in field 1208. The interface operator may then select a save event command option 1114 to record the identified object source of the anomaly, associated comments regarding the anomaly and anomaly location information 1116 for future reference and analysis of the captured anomaly event. Thereafter, the interface operator may return to main display 200, via command option 1110, and restart movement of the patrol vehicle to restart data sampling of the scene being traversed.

Captured events that have been previously saved by the interface operator may be viewed by selecting a saved event file from an events listing 1302 available in section 1300 of playback control panel 804. To open a saved event provided in listing 1302, the interface operator, or any other applicable user, may select the desired event and then select a load event command option 1304. When the desired event is loaded, display 800 is populated with all data related to the selected event (e.g., location information, object identification, comments, captured video image frame and corresponding measurement data). To play the video associated with a loaded event, the interface operator may move the pinpoint indicator 801 to the desired starting location on video display 802 in which he/she wishes to begin viewing and select play command option 1102.

Information that has been populated, for example, into section 1200 may be edited. For instance, if it is determined that an object previously identified as the source of a stray voltage anomaly is not indeed the source of the anomaly, field 1208 may be edited using commands 1206 and 1207 to, respectively, add a new source and remove the inaccurate source. Once changes have been made, the interface operator may select an update command option 1306 to have the new information saved in connection with the previously saved event.

When an event is saved, apparatus 100 may be configured to generate a database entry for the saved event and create separate files for video and corresponding sensor related data. For example, apparatus 100 may be configured to create an AVI file for storing video images and an XML file for storing all other sensor related data. These files may be saved on a hard disk (e.g., memory component 116) and retrieved when the corresponding event is selected and loaded using playback control panel 804 on event capture display 800. If it is determined that saved events are no longer needed or have been archived elsewhere, or alternatively, if additional storage space is needed in apparatus 100, the interface operator may delete command options 1308 and 1310 provided on section 1300 of playback control panel 804.

Figure 3:
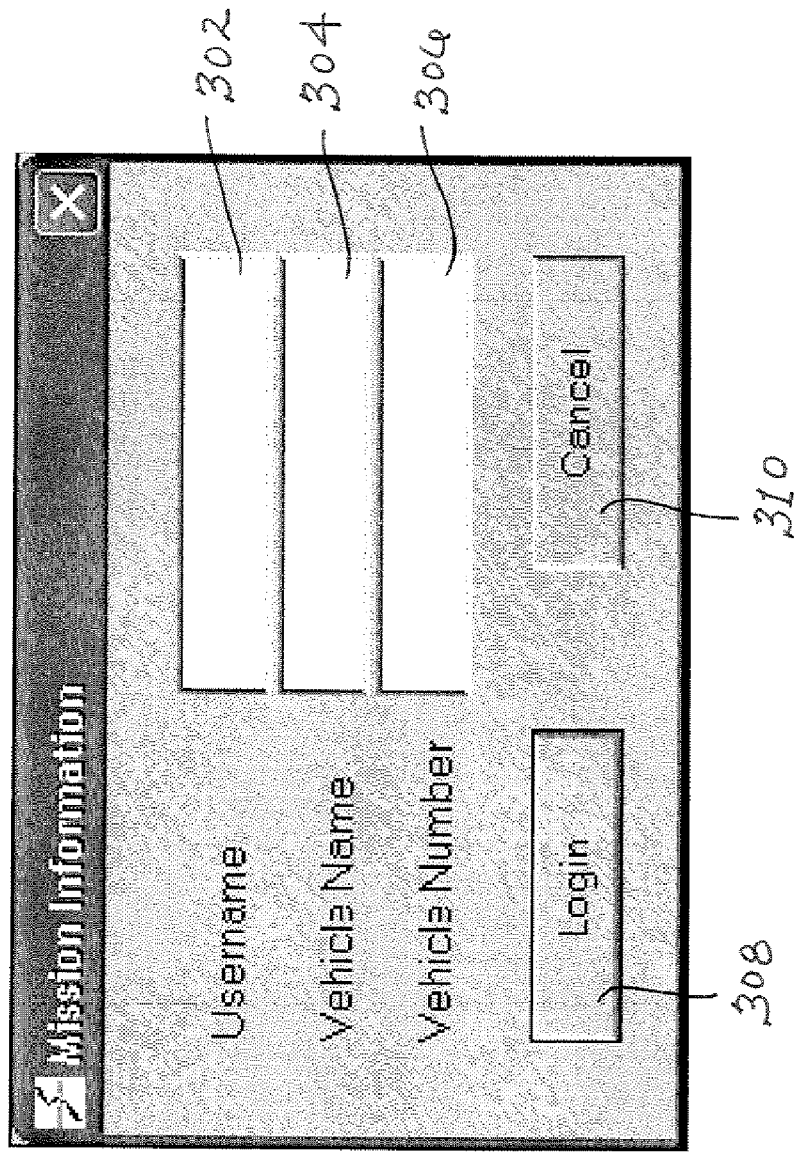
FIG. 3 illustrates an exemplary main display produced by a system upon successful logging in of an operator at the illustrative display in FIG. 2 in accordance with an embodiment of the present invention.
Figure 14:
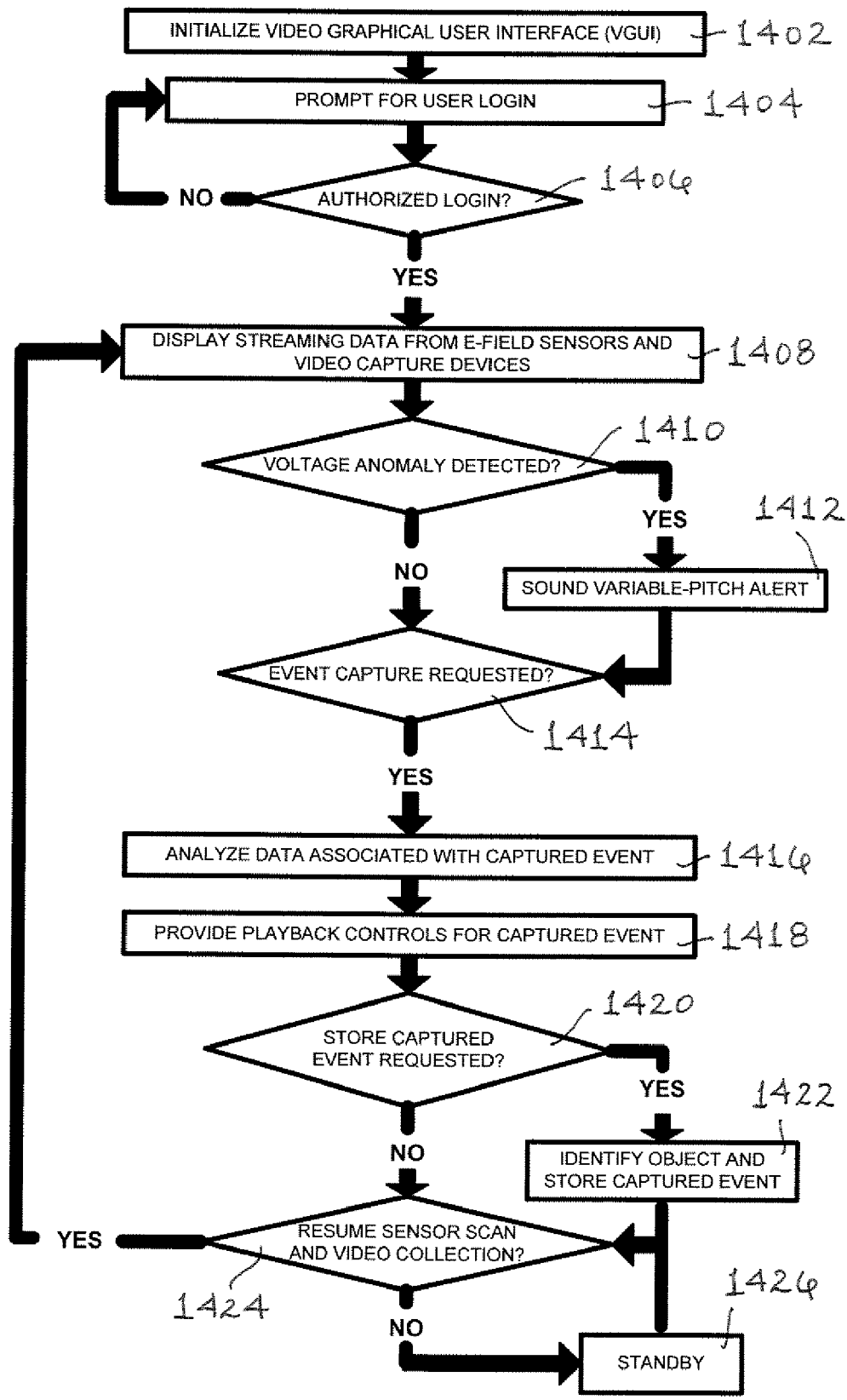
FIG. 14 is a flowchart illustrating the steps employed by the system in monitoring electric fields in accordance with an embodiment of the present invention.

An illustrative depiction of the general steps employed in use of VGUI 120 of apparatus 100 for monitoring and controlling the detection of a stray voltage anomaly is described with reference to the flowchart of FIG. 14. As previously described, the monitoring of streaming data displayed on video display 122 of GUI 120 is initiated, at step 1402, by providing user login information at step 1404. If the login information provided at display 300 of FIG. 3 is determined at step 1406 to be for an authorized user, then VGUI 120 may begin to sample data and provide a visual output of streaming data, at step 1408, on main display 200, which may be driven by movement of the patrol vehicle equipped with apparatus 100.

Upon detection of a stary voltage anomaly at step 1410, GUI 120 of apparatus 100 may audibly, via a variable-pitched alert tone at step 1412, and visually, via a spike in plots provided on graphical video display 202, prompt the interface operator. When initial detection of a potential anomaly is detected at step 1410, interface operator may decide to capture the event at step 1414 by selecting event capture command option 514 provided on control panel 204 of main display 200. In response to the user initiated instruction to capture an event, additional processing may be executed to collect additional information about the captured event and an additional alert notification may be provided to the interface operator at step 1416, indicating to the interface operator that the subsequent processing of the captured event is likely a stray voltage anomaly.

Playback controls are provided to the interface operator, at step 1418, via control panel 804 on event capture display 800 of FIG. 8. After the interface operator has had an opportunity to review information related to the captured event, as well as identify the source emitting the stray voltage anomaly at step 1422, he/she may record the event at step 1420. Thereafter, the interface operator may elect to resume data sampling of the area being patrolled at step 1424, thereby reinitiating the receipt of streaming data at main display 200. GUI 120 may go into a standby mode, at step 1426, if no action is taken after a predetermined amount of time or, alternatively, if the interface operator elects to suspend data sampling by selecting, e.g., suspend command option 510 on control panel 204 of main display 200.

One skilled in the art will appreciate that the present invention can be practiced by other than the described embodiments, which are presented for purposes of illustration and not by way of limitation, and the present invention is limited only by the claims that follow.

What is claimed is:

1. A mobile apparatus for monitoring an electric field in a patrolled area, comprising:
    at least one detection device for measuring electric field signals;
    at least one camera device for collecting video images of said patrolled area;
    a processor for correlating video image data collected from said at least one camera device with electric field signal data measured by said at least one detection device; and
    a video based graphical user interface for analyzing and, capturing a monitored event depicting an anomaly in said measured electric field signals, wherein said anomaly represents a stray voltage emitted from a power distribution system.

2. The mobile apparatus of claim 1, further comprising a wireless transceiver component for transmitting and receiving data associated with said captured events to and from at least one remote device.

3. The mobile apparatus of claim 1, further comprising a global positioning system receiver for tagging a video image frame from said collected video image data and corresponding electric field measurement with instantaneous position information pertaining to location and time.

4. The mobile apparatus of claim 1, further comprising a wheel speed sensor for determining a distance of travel of a patrol vehicle equipped with said mobile apparatus.

5. The mobile apparatus of claim 1, further comprising a means for emitting a variable-pitched tone corresponding to a strength value associated with said measured electric field signals.

6. The mobile apparatus of claim 1, further comprising a means for emitting an alert tone in response to a potentially detected stray voltage anomaly.

7. The mobile apparatus of claim 1, wherein said at least one detection device for measuring electric field signals employs at least one sensor probe adaptable for mobility into said electric fields.

8. The mobile apparatus of claim 1, wherein said video based graphical user interface displays video image frames from said collected video image data of said patrolled area and a graphical display of corresponding electric field measurements.

9. The mobile apparatus of claim 8, wherein said graphical display of corresponding electric field measurements are overlaid on said video image frames.

10. The mobile apparatus of claim 8, wherein said graphical display of corresponding electric field measurements is comprised of a raw electric field measurement plot, an adaptive threshold plot and a processed electric field measurement plot.

11. The mobile apparatus of claim 10, wherein said adaptive threshold plot is set relative to a local ambient or background noise level that is generated from data gathered prior to and subsequent to measurement of raw electric field data.

12. The mobile apparatus of claim 11, wherein said anomaly is detected when said processed electric field measurement plot exceeds said adaptive threshold plot.

13. The mobile apparatus of claim 12, wherein a source of said anomaly is identified by isolating an object discovered within close proximity to a peak of a spike in said raw electric field measurement plot.

14. The mobile apparatus of claim 1, wherein said captured event depicting said anomaly is recorded for subsequent analysis and action.

15. A method for presenting video and locally-generated graphics to a user at a computer having a display, comprising;
    initializing and providing said user with a video-based graphical user interface on said display;
    displaying a video image frame of a patrolled area and electric field signal measurements in said graphical user interface on said display, wherein said electric field signal measurements are overlaid on said video image frame to provide a direct visual depiction of a location of a particular measurement;
    providing said user with an event capture option on said graphical user interface to identify a source in a captured event emitting an anomaly, wherein said captured event is captured using said event capture option and said anomaly represents a stray voltage emitted from a power distribution system; and
    providing said user with playback controls on said graphical user interface for reviewing said captured event.

16. The method of claim 15, further comprising transmitting and receiving data associated with said captured events to and from at least one remote device.

17. The method of claim 15, further comprising tagging a video image with instantaneous position information pertaining to location and time.

18. The method of claim 15, further comprising emitting a variable-pitched tone corresponding to a strength value associated with said measured electric field signals.

19. The method of claim 15, further comprising emitting an alert tone in response to a potentially detected stray voltage anomaly.

20. The method of claim 15, wherein said graphical user interface displaying electric field signal measurements further comprises displaying a raw electric field measurement plot, an adaptive threshold plot and a processed electric field measurement plot.

21. The method of claim 20, further comprising setting said adaptive threshold plot to a local ambient or background noise level that is generated from data gathered prior to and subsequent to measurement of raw electric field data.

22. The method of claim 21, further comprising indicating a detection of said anomaly when said processed electric field measurement plot exceeds said adaptive threshold plot.

23. The method of claim 22, further comprising identifying a source of said anomaly by isolating an object discovered within close proximity to a peak of a spike in said raw electric field measurement plot.

24. The method of claim 15, further comprising recording said captured event depicting said anomaly for subsequent analysis and action.

25. A monitoring system comprising a computer having a display, wherein the computer is configured to:
    initialize and provide a user with a video-based graphical user interface on said display;
    display a video image frame of a patrolled area and electric field signal measurements in said graphical user interface on said display, wherein said electric field signal measurements are overlaid on said video image frame to provide a direct visual depiction of a location of a particular measurement;
    provide said user with an event capture option on said graphical user interface to identify a source in a captured event emitting an anomaly, wherein said captured event is captured using said event capture option and said anomaly represents a stray voltage emitted from a power distribution system; and
    provide said user with playback controls on said graphical user interface for reviewing said captured event.

26. The monitoring system of claim 25, further configured to transmit and receive data associated with said captured events to and from at least one remote device.

27. The monitoring system of claim 25, further configured to tag a video image with instantaneous position information pertaining to location and time.

28. The monitoring system of claim 25, further configured to emit a variable-pitched tone corresponding to a strength value associated with said measured electric field signals.

29. The monitoring system of claim 25, further configured to emit an alert tone in response to a potentially detected stray voltage anomaly.

30. The monitoring system of claim 25, wherein said graphical user interface displaying electric field signal measurements is further configured to display a raw electric field measurement plot, an adaptive threshold plot and a processed electric field measurement plot.

31. The monitoring system of claim 30, further configured to set said adaptive threshold plot to a local ambient or background noise level that is generated from data gathered prior to and subsequent to measurement of raw electric field data.

32. The monitoring system of claim 31, further configured to indicate a detection of said anomaly when said processed electric field measurement plot exceeds said adaptive threshold plot.

33. The monitoring system of claim 32, further configured to identify a source of said anomaly by isolating an object discovered within close proximity to a peak of a spike in said raw electric field measurement plot.

34. The monitoring system of claim 25, further configured to record said captured event depicting said anomaly for subsequent analysis and action.

35. A computer readable medium encoded with machine-readable instructions for use in presenting video and locally generated graphics to a user at a computer having a display, the machine-readable instructions comprising:
   initializing and providing said user with a video-based graphical user interface on said display;
   displaying a video image frame of a patrolled area and electric field signal measurements in said graphical user interface on said display, wherein said electric field signal measurements are overlaid on said video image frame to provide a direct visual depiction of a location of a particular measurement;
   providing said user with an event capture option on said graphical user interface to identify a source in a captured event emitting an anomaly, wherein said captured event is captured using said event capture option and said anomaly represents a stray voltage emitted from a power distribution system; and
   providing said user with playback controls on said graphical user interface for reviewing said captured event.

36. The computer readable medium of claim 35, further comprising transmitting and receiving data associated with said captured events to and from at least one remote device.

37. The computer readable medium of claim 35, further comprising tagging a video image with instantaneous position information pertaining to location and time.

38. The computer readable medium of claim 35, further comprising emitting a variable-pitched tone corresponding to a strength value associated with said measured electric field signals.

39. The computer readable medium of claim 35, further comprising emitting an alert tone in response to a potentially detected stray voltage anomaly.

40. The computer readable medium of claim 35, wherein said graphical user interface displaying electric field signal measurements further comprises displaying a raw electric field measurement plot, an adaptive threshold plot and a processed electric field measurement plot.

41. The computer readable medium of claim 40, further comprising setting said adaptive threshold plot to a local ambient or background noise level that is generated from data gathered prior to and subsequent to measurement of raw electric field data.

42. The computer readable medium of claim 41, further comprising indicating a detection of said anomaly when said processed electric field measurement plot exceeds said adaptive threshold plot.

43. The computer readable medium of claim 42, further comprising identifying a Source of said anomaly by isolating an object discovered within close proximity to a peak of a spike in said raw electric field measurement plot.

44. The computer readable medium of claim 35, further comprising recording said captured event depicting said anomaly for subsequent analysis and action.

* * * * *

UNITED STATES PATENT AND TRADEMARK OFFICE
CERTIFICATE OF CORRECTION

| | | Page 1 of 1 |
|---|---|---|
| PATENT NO. | : 7,486,081 B2 | |
| APPLICATION NO. | : 11/551222 | |
| DATED | : February 3, 2009 | |
| INVENTOR(S) | : David Kalokitis et al. | |

It is certified that error appears in the above-identified patent and that said Letters Patent is hereby corrected as shown below:

On The Title Page,

In Column 1, at the end of item (63), insert:

--, which claims benefit of U.S. Patent Application Serial No. 60/639,054, filed on December 23, 2004 and U.S. Patent Application Serial No. 60/641,470, filed on January 5, 2005.--

Signed and Sealed this
Second Day of June, 2015

Michelle K. Lee
*Director of the United States Patent and Trademark Office*